Nov. 19, 1968 B. D. SCHWALM 3,411,615
BRACKET FOR RETRACTABLE FINGER CROP FEEDING DRUM
Filed Jan. 30, 1967
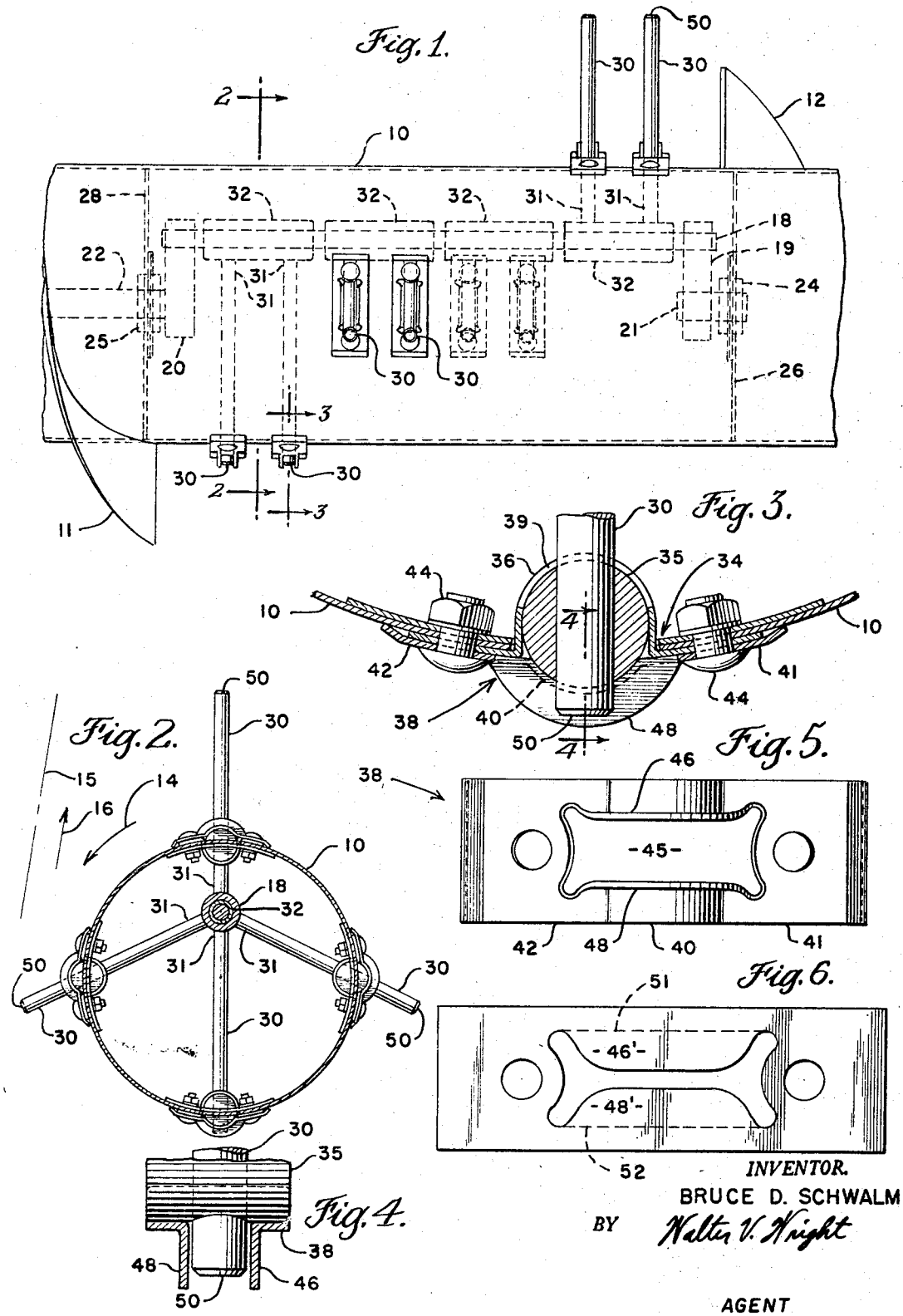
INVENTOR.
BRUCE D. SCHWALM
BY Walter V. Wright
AGENT

United States Patent Office 3,411,615
Patented Nov. 19, 1968

3,411,615
BRACKET FOR RETRACTABLE FINGER CROP FEEDING DRUM
Bruce D. Schwalm, Leola, Pa., assignor to Sperry Rand Corporation, New Holland, Pa., a corporation of Delaware
Filed Jan. 30, 1967, Ser. No. 612,451
1 Claim. (Cl. 198—211)

ABSTRACT OF THE DISCLOSURE

A retractable feed finger bearing bracket having stripping flanges to prevent forage crops from wrapping about a feed drum.

Background of the invention

Retractable finger feeding drums have been known for some time in the combine, or grain harvesting, art. The aggressiveness of these feeding devices in grain crops has recently led to their attempted use on forage, or green crop, harvesters. Contrary to expectations, the retractable finger feeding drum has not proven to be completely satisfactory in handling green cut forage crops. It has exhibited a tendency to become wrapped with crop material, particularly when handling succulent leafy material such as sudan grass or the like. This material has different physical characteristics than the dry straw type material commonly encountered in grain harvesting operations. The wrapping of the drum by green forage crops is initiated by the adherence of material to the slightly protruding ends of the retractable fingers, when the fingers are in their fully retracted crop release positions.

If the fingers retract inwardly beyond the thickness of the outer bearing block brackets, they may strike the brackets upon re-emergence with resulting damage to the mechanism. If the fingers protrude outwardly beyond the surface of the bearing block brackets, as is the custom in the combine or grain feeding devices, the drum will become wrapped when operating in certain green cut forage crops. Thus, the finger ends must be stopped in their most retracted position within the dimension limits of the thickness of the bearing bracket material. The manufacturing problems and costs to achieve this precise relationship between the finger ends and the drum is prohibitive because the relationship is affected by an accumulation of the manufacturing tolerances of a large number of preceding elements and sub-assemblies.

Summary of the invention

The present invention eliminates the wrapping problems which previously inhibited the successful handling of green cut forage crops with a retractable finger feeding drum. Moreover, it enables the successful feeding of forage crops with a retractable finger feeding drum with no tightening of the manufacturing tolerances of any of the elements or sub-assemblies over those in effect for the manufacture of similar drums for use in grain crop harvesting operations; and with no increase in the manufacturing cost. These results are achieved by a modification of the outer finger guide bearing block retaining bracket. The bracket is stamped from sheet stock. The specific improvement is the formation of a pair of flanges on the bracket out of portions of the sheet stock that were previously cut off and discarded as scrap. The flanges are contoured so as to provide no abrupt projections upon which crop material can adhere. The flanges have a radial projection from the drum surface that enables the outer ends of the retractable fingers to withdraw below the edges of the flanges for positive crop material stripping, while remaining outwardly beyond the inner surface of the bearing block retaining bracket; and without resort to tightened manufacturing tolerances and the accompanying increased production cost.

Brief description of the drawings

FIG. 1 is a fragmentary plan view of a crop material consolidating auger and retractable finger feeding drum, for use on a forage harvester auger header, embodying brackets constructed in accordance with the principles of the present invention;

FIG. 2 is a cross sectional view taken on the line 2—2 of FIG. 1 but with the drum displaced approximately ninety degrees in the counterclockwise direction from the position shown in FIG. 1 in order to better fit the drawings of FIG. 2 in the available space on the sheet;

FIG. 3 is an enlarged sectional view taken on the line 3—3 of FIG. 1;

FIG. 4 is a sectional view taken on the line 4—4 of FIG. 3;

FIG. 5 is a detailed view of the bearing block retaining clip of the present invention; and FIG. 6 is a detailed view of the sheet stock blank from which the bracket of FIG. 5 is formed.

Description of the preferred embodiment

For a better understanding of the environment of the present invention, reference may be had to U.S. Patent 3,022,882 which illustrates a common type of forage harvester header. A major element of forage harvester headers of this type is a transversely disposed auger having oppositely spiralling flighting at the respective ends of the auger and some form of straight rearwardly operating feeding mechanism in the center of the header to feed rearwardly the crop material that is swept inwardly to the center of the auger by the outlying flighting. Such an element is clearly illustrated in the above mentioned patent. In FIG. 1 of the present drawings, the reference numeral 10 indicates an elongated hollow cylinder having oppositely directed spiral flighting 11 and 12 fixed on the outer surface thereof adjacent its respective ends. The central section of the cylinder 10 is free of flighting and constitutes a feeding drum. The cylinder 10 rotates about its own central longitudinal axis. The direction of rotation of drum 10 is indicated in FIG. 2 by the directional arrow indicated by reference numeral 14. In FIG. 2, the broken line 15 indicates a plane parallel to the ground over which the forage harvester would be travelling. The direction of ground travel of the machine is indicated by the directional arrow 16.

As may be seen in phantom lines in FIG. 1, a crank rod 18 is disposed inside cylindrical drum 10. The crank rod 18 is located eccentrically relative to the major axis of the cylindrical drum. Crank arms 19 and 20 support the crank rod 18. The arms 19 and 20, in turn, are attached to shafts 21 and 22 which are, respectively, journalled in bearings 24 and 25. The bearings are mounted in internal plates, or spiders, 26 and 28 disposed inside the cylindrical drum 10. It may be seen in FIG. 1 that the shaft 22 extends laterally outwardly through the portion of the housing supporting auger flighting 11. The distal end of shaft 22 is rigidly attached to the frame or housing of the forage harvester header to prevent the crank from rotating relative to the base frame of the machine. The main cylindrical drum 10 rotates about the central axis of the bearings 24 and 25 which are coaxial with the central axis of the drum. This internal feeding drum construction is well known in the combine and grain crop feeding art. Four sets of feed fingers 30 have inner ends 31 (FIG. 2) carried by sleeves 32 which are journalled on the crank rod 18. It will be apparent in FIG. 2 that as cylindrical drum 10 rotates about its own central axis, with crank arm 18 being held stationary by the anchored end of shaft 22, the fingers 30 will be carried about crank rod 18 since their inner ends 31 are fixed to the sleeves 32 journalled on the crank rod. As the fingers 30 rotate about the axis of crank rod 18 they progressively extend and retract relative to the outside surface of drum 10. The fingers project outwardly through radial apertures in the surface of drum 10. One such aperture is generally indicated by the reference numeral 34 in FIG. 3.

As may be seen in FIG. 3, the outer end portion of the feed fingers 30 extend through a finger guiding bearing block 35 which is disposed in the aperture 34 of drum 10. The bearing block 35 is held in place by a pair of slotted brackets 36 and 38, as is known in the combine art. The inner bracket 36 has a slot 39 which is elongated in the circumferential direction relative to drum 10 and through which the finger 30 passes. The bearing block 35 is also provided with a central aperture (no reference numeral) through which finger 30 extends. With this arrangement, the bearing block 35, while being retained in the aperture 34, is free to rock relative to the drum about an axis parallel to the central axis of the drum. This arrangement affords a guiding action for the radially outer end of the finger while allowing the finger to extend and retract relative to drum 10 and to rock from a forwardly incline to a rearwardly inclined orientation relative to the direction of travel of the surface of the rotating drum 10.

The bearing block 35 is retained in cylinder 10 against radially outward movement by the outer bracket 38. Bracket 38, as may be seen in FIG. 3, has an arcuate central portion 40 contoured to receive bearing block 35, and generally planar ear portions 41 and 42 disposed along opposite ends of the central portion 40 as measured around the circumference of drum 10. As is shown in FIG. 3 the brackets 36 and 38 and bearing block 35 are held in place on drum 10 by a pair of studs 44 which extend through the ear portions 41 and 42 of the brackets and through the cylindrical drum 10.

The outer bracket 38 is shown alone in FIG. 5. A central slot 45 is formed in the main body portion 40 of the bracket. Slot 45 is elongated in the circumferential direction relative to the cylindrical drum 10 on which it mounts. When the bracket is in position on drum 10, the elongated slot 45 overlies the radial aperture 34 in the drum to allow the fingers 30 to project outwardly through the slot 45. The ears 41 and 42 of bracket 38 are disposed along circumferentially opposite ends of the drum apertures. A pair of outturned flanges 46 and 48 are formed integrally with bracket 38 and extend along the opposite axial sides of slots 45 relative to drum 10. As may be seen in FIG. 3, wherein flange 48 visible, the flanges are generally semi-circular planar projections on the outer face of the bracket 38. The maximum radial outward projection of the flanges occurs midway between the ends of slot 45, and the flanges diminish progressively in the circumferential directions relative to drum 10 from the portion of maximum radial projection to the planes of ear portions 41 and 42 at the ends of slot 45. When the feed fingers 30 are in their most retracted positions, as illustrated in FIGS. 3 and 4, the outermost ends 50 of the fingers 30 are withdrawn below the radial outer edges of the flanges. As the fingers 30 retract to this withdrawn position, the flanges 46 and 48 positively strip any crop material from the projecting end of the finger even though a portion of the finger is still projecting radially outwardly beyond the surface of drum 10. The leading and trailing ends of the flanges cannot snag crop material since the flanges diminish gradually to the planes of the bracket ears 41 and 42 from their central portions of maximum radial projection.

FIG. 6 illustrates a blank of sheet stock from which the bracket 38 of FIG. 5 is stamped. The broken lines 51 and 52 in FIG. 6 indicate portions of material that customarily are cut out of the blank and discarded as scrap.

As indicated in FIG. 6 by the reference numerals 46' and 48' these portions of material are now merely bent radially outwardly to form the flanges 46 and 48. This is accomplished in the same single stamping operation that produces bracket 38 from the sheet stock blank.

Due to the cumulative effect of the manufacturing tolerances of the crank assembly and its components, the bearing mounts for the crank and feeding drum and even the header base frame on which the drum 10 is journalled, it is difficult to predict in any given assembly precisely where the end 50 of a finger 30 will lie, relative to the surface of drum 10, when the finger is in its fully retracted position. If the outer end 50 of a feed finger retracts below the main body portion 40 of outer bracket 38, there is a danger that it will strike the edge of the bracket slot when it next emerges. This possibility is readily avoided in the feeding drums for grain crops, or other dry straw-like materials, by simply forming the feed fingers of sufficient length that they are sure to remain outside the outer surface of drum 10 under the worst possible conditions of manufacturing tolerance buildup. This solution, however, is inadequate for feeding drums for forage or green cut crops because the protruding ends of the feed fingers cause the green cut material to wrap around the drum. The sheet metal stock from which the outer bearing block bracket is formed, is slightly in excess of one sixteenth of an inch thick. To successfully feed forage crops with the usual retractable feeding finger drum construction, it would be necessary to construct the drum in such a manner that the end 50 of each feed finger 30 would lie within the one sixteenth of an inch space between the inner and outer surfaces of the outer bearing block bracket when the finger 30 is fully retracted. With the bracket of the present invention, the limits within which the end of the feed finger must lie, when fully retracted, extend from the inner surface of the main body portion of the bracket to the radially outermost edges of the flanges 46 and 48. This is a distance approaching one-half inch and is readily achievable with present manufacturing tolerances of the grain crop retractable finger feeding drums. Thus, the modified bracket, alone, converts the grain crop feeding drum for use with forage crops at no increase in the cost of the overall structure. Since the flanged bracket in no way detracts from the ability of the drum to feed grain crops, a single drum construction including the bracket of the present invention, may be used for both grain and forage crops.

Having thus described my invention, what I claim is:

1. In a crop feeding apparatus for forage harvesters or the like having a hollow drum rotatable about its own longitudinal axis and having its peripheral wall provided with a radial aperture, a stationary crank disposed within said drum and having a portion eccentrically located relative to said axis of rotation of the drum, a finger member having an inner end and an outer end, means pivotally mounting said inner end on said eccentrically located portion of said crank, said finger member projecting outwardly through said aperture in said drum wall whereby rotation of said drum about said crank effects extension and retraction of said finger member relative to said aperture, a bracket member covering said radial aperture and having generally planar ear portions disposed along circumferentially opposite ends of said aperture, means fastening said ear portions of said bracket to said peripheral wall of said drum, said bracket having a circumferentially elongated slot therein through which said finger member projects, said finger member being of sufficient length to insure that said outer end of the finger member remains outside said drum and radially outwardly of said bracket ear portions when the finger member is in its most retracted position, the improvement residing in said bracket member and comprising a pair of radially outwardly projecting flanges formed integrally with said bracket member, said flanges constituting a generally semi-circular planar projection on said bracket elongated in the circumferential direction relative to said drum and respectively disposed along axially opposite sides of said slot and on opposite sides of said extendable and retractable finger member, each flange having a portion of maximum radial projection from said drum intermediate said ear portions of said bracket, said flanges diminishing progressively in the circumferential direction from said portion of maximum radial projection to the planes of said ear portions at the respective circumferential ends of the slot, the outer end of said finger member retracting radially inwardly of said maximum radial projection of the flanges when the finger member is in said most retracted position.

References Cited

UNITED STATES PATENTS

| | | | |
|---|---|---|---|
| 2,633,231 | 3/1953 | Pilcher | 198—211 |
| 2,644,292 | 7/1953 | Oberholtz et al. | |
| 2,696,290 | 12/1954 | Carroll | 198—9 X |
| 2,700,865 | 2/1955 | Russell | 56—364 |
| 2,748,921 | 6/1956 | White | 198—211 |
| 3,226,921 | 1/1966 | Shepley | 56—364 |

EVON C. BLUNK, *Primary Examiner.*

M. L. AJEMAN, *Assistant Examiner.*